Sept. 25, 1923.
A. BROADMEYER
PAPER RULING MECHANISM
Filed Sept. 8, 1921
1,468,798
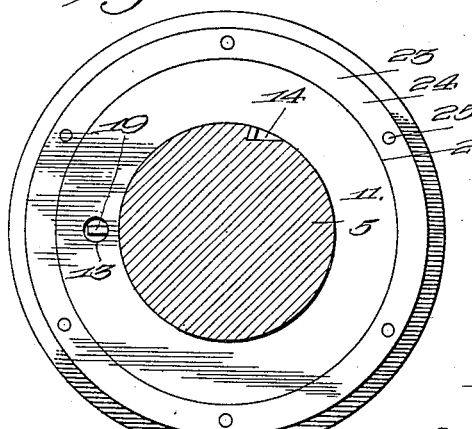
Fig. 1.
Fig. 2.
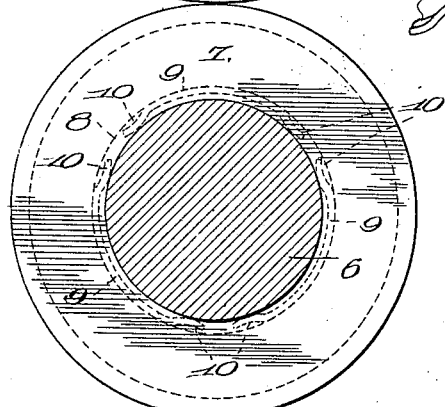
Fig. 4.
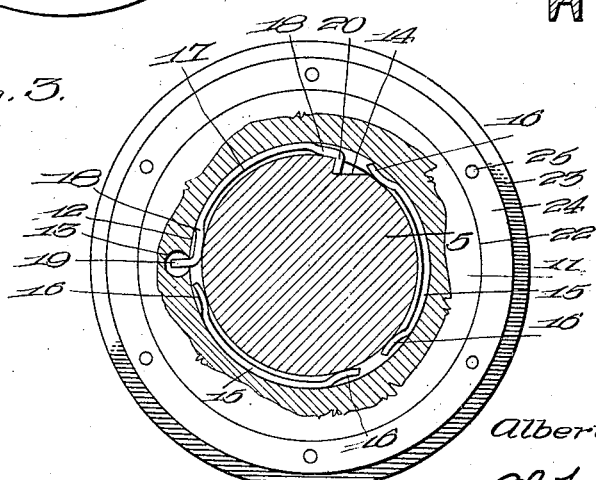
Fig. 3.
Inventor,
Albert Broadmeyer,
By
Attorney Patented Sept. 25, 1923.

1,468,798

UNITED STATES PATENT OFFICE.

ALBERT BROADMEYER, OF HARRISBURG, PENNSYLVANIA, ASSIGNOR TO THE W. O. HICKOK MFG. CO., OF HARRISBURG, PENNSYLVANIA, A CORPORATION OF PENNSYLVANIA.

PAPER-RULING MECHANISM.

Application filed September 8, 1921. Serial No. 499,332.

*To all whom it may concern:*

Be it known that I, ALBERT BROADMEYER, a citizen of the United States, residing at Harrisburg, in the county of Dauphin and State of Pennsylvania, have invented certain new and useful Improvements in Paper-Ruling Mechanism, of which the following is a specification.

The present invention relates to ruling apparatus, in which the ruling instrument or pen is in the form of a rotatable disk.

The primary object is to provide a structure of this kind that is held effectively on the supporting shaft in properly centered relation thereto, and yet may be moved to different positions with ease and expedition. A further and important object is to provide a structure in which the ruling element per se can be readily removed and replaced without the necessity of dismantling the entire structure.

In the accompanying drawings:—

Figure 1 is a sectional view through a ruling unit of the improved character,

Figure 2 is a sectional view at right angles to Figure 1,

Figure 3 is a detail view showing the hub portion broken away,

Figure 4 is a detail perspective view of one of the friction springs.

In the embodiment disclosed, parallel shafts 5 and 6 are employed. On one of these shafts is located a paper-supporting element in the form of a disk 7 having an internal annular groove or channel 8. In this channel is located a series of friction leaf springs 9, three being illustrated. These springs are bowed as shown and have outwardly curved terminal portions 10. They are located longitudinally in the channel and are placed under tension so that they frictionally engage the shaft 6 and thus effectively hold the disk in place thereon. Moreover they provide a plurality of bearings on different sides of the shaft, thereby properly centering the disk 7 thereon.

Coacting with the supporting disk is a ruling element. This ruling element, as shown, comprises a hub portion 11 that is slidably fitted on the shaft 5 and is provided with an internal annular channel 12. It is furthermore provided with a notch 13 that opens into the channel 12 and is preferably formed by drilling a hole transversely through the hub portion, said hole intersecting the channel. The shaft 5 is also provided with a longitudinally disposed keyway 14. Friction springs are located in the channel 12 and bear upon the shaft 5. Two of these friction springs are in the form of bowed leaves 15 having curved ends 16 that bear against the surface of the shaft at different points. A third spring 17 is in the form of a bowed leaf, having spaced portions 18 that bear against the shaft 5. This spring 17 also has an outturned terminal 19 engaged in the notch 13 and an inturned terminal 20 engaged in the seat 14. As a result the hub portion is frictionally held against longitudinal movement on the shaft 5, is properly centered by reason of the bearing points of the springs, and is also effectively held against relative rotation with respect to the shaft 5 by reason of the spring 17 that constitutes a key connection between said shaft and the hub portion.

The hub portion is also provided with an outstanding jaw flange 21, defining a shoulder or seat 22 adapted to receive the marking element. This element preferably is in the form of a thin disk or ring 23 that projects beyond the flange 21. A holding ring 24 is fitted upon the shoulder on the opposite side of the flange 21 and said ring 24 and flange 21 serve as clamps for the ring 23, being drawn toward each other by screws 25.

Obviously with the said structure the marking element and supporting disk can be placed in any desired location on the shafts 5 and 6, and when so placed will retain their proper cooperative relation. Should it become desirable to replace the marking element, it is only necessary to detach the clamping ring 24, whereupon the said marking element can be detached from the hub portion.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:

1. In a ruling machine, the combination with a shaft, of a ruling disk mounted thereon and including a chambered hub portion, and yielding friction means in the chambered hub portion and movable with respect thereto, said means frictionally binding upon the shaft.

2. In a ruling machine, the combination with a shaft, of a ruling disk mounted thereon and including a chambered hub portion, and yielding friction means in the chambered hub portion and movable with respect thereto, said means frictionally binding upon different sides of the shaft to center the disk thereupon and hold it against accidental longitudinal movement with respect to the shaft.

3. In a ruling machine, the combination with a shaft, of a ruling disk mounted thereon and including a hub portion having an annular internal chamber, and springs located in said chamber and bearing against different sides of the shaft.

4. In a ruling machine, the combination with a shaft, of a ruling disk mounted thereon and including a hub portion having an annular internal chamber, and bowed leaf springs located lengthwise in said chamber and having their ends bearing against different sides of the shaft.

5. In a ruling machine, the combination with a shaft, of a ruling disk mounted thereon and including a chambered hub portion, and yielding friction means in the chambered hub portion that frictionally bind upon the shaft, said means constituting a key to hold the disk and shaft against relative rotation.

6. In a ruling machine, the combination with a shaft, of a ruling disk mounted thereon and including a hub portion having an annular internal chamber, and springs located in said chamber and bearing against different sides of the shaft, said shaft having a keyway and one of said springs engaging in the keyway to hold the disk and shaft against relative rotation.

7. In a ruling machine, the combination with a shaft, of a ruling disk mounted thereon and including a hub portion having an annular internal chamber, and bowed leaf springs located lengthwise in said chamber and having their ends bearing against different sides of the shaft, said shaft having a keyway and said hub portion having a notch, and one end of the spring being offset and engaged in the keyway and its other end being engaged in the notch.

8. In a ruling machine, the combination with a shaft, of a ruling disk mounted thereon and having a hub portion surrounding the shaft, and a spring interposed between the shaft and hub portion and acting frictionally, holding the shaft and disk against relative movement.

9. In a ruling machine, the combination with a shaft, of a hub slidably mounted thereon and having an internal annular channel, friction and centering springs in the channel bearing against the shaft, certain of the springs interlocking with the shaft and hub to hold the two against relative rotation, said hub having a peripheral outstanding clamping flange, a pen ring that fits on the hub alongside the flange, and a clamping ring mounted on the hub on the opposite side of the pen ring to the flange.

10. In a ruling machine, the combination with parallel shafts, of a hub frictionally and slidably mounted on one shaft and having a peripheral pen ring, and a supporting disk frictionally and slidably mounted on the other shaft and having a peripheral groove that underlies the pen ring.

11. In a ruling machine, the combination with parallel shafts, of a hub slidably mounted on one shaft and having an internal annular channel, centering and friction springs in said channel bearing on the shaft, a peripheral pen ring on said hub, a supporting disk on the other shaft having an internal annular channel, and friction and centering springs in said channel bearing upon the second shaft, said disk having a peripheral groove that underlies the pen ring.

In testimony whereof, I affix my signature in the presence of two witnesses.

ALBERT BROADMEYER.

Witnesses:
C. M. BUFFINGTON,
ROSS A. HICKOK.